July 17, 1923.
W. J. BEISEL
SPRING WHEEL
Filed Dec. 7, 1921
1,462,441
2 Sheets-Sheet 2
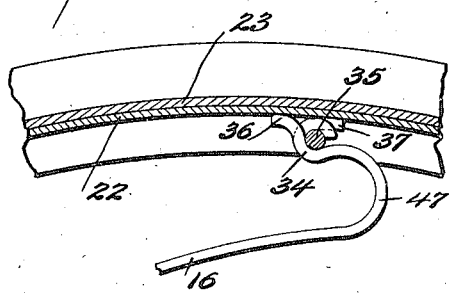
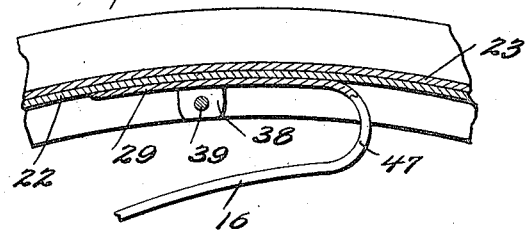
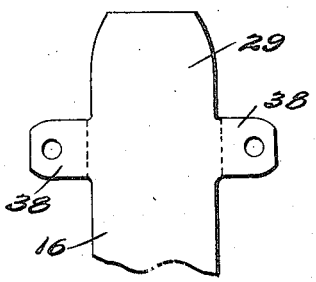
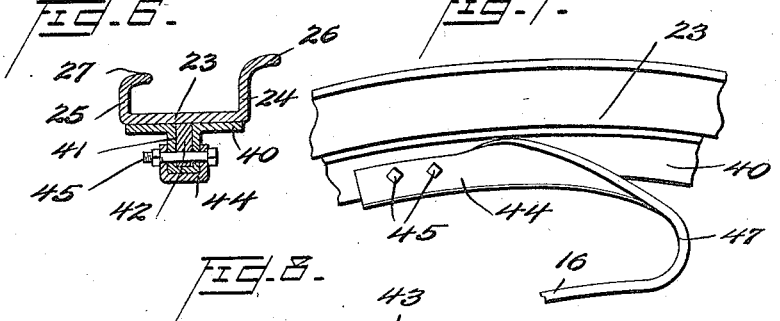
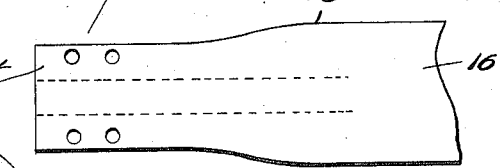
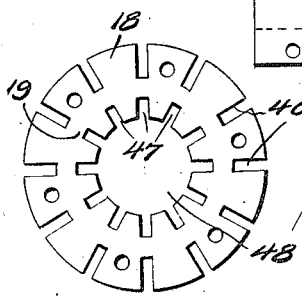
Inventor
William J. Beisel
By Watson, Coit, Morse & Grindle
Attorneys Patented July 17, 1923.

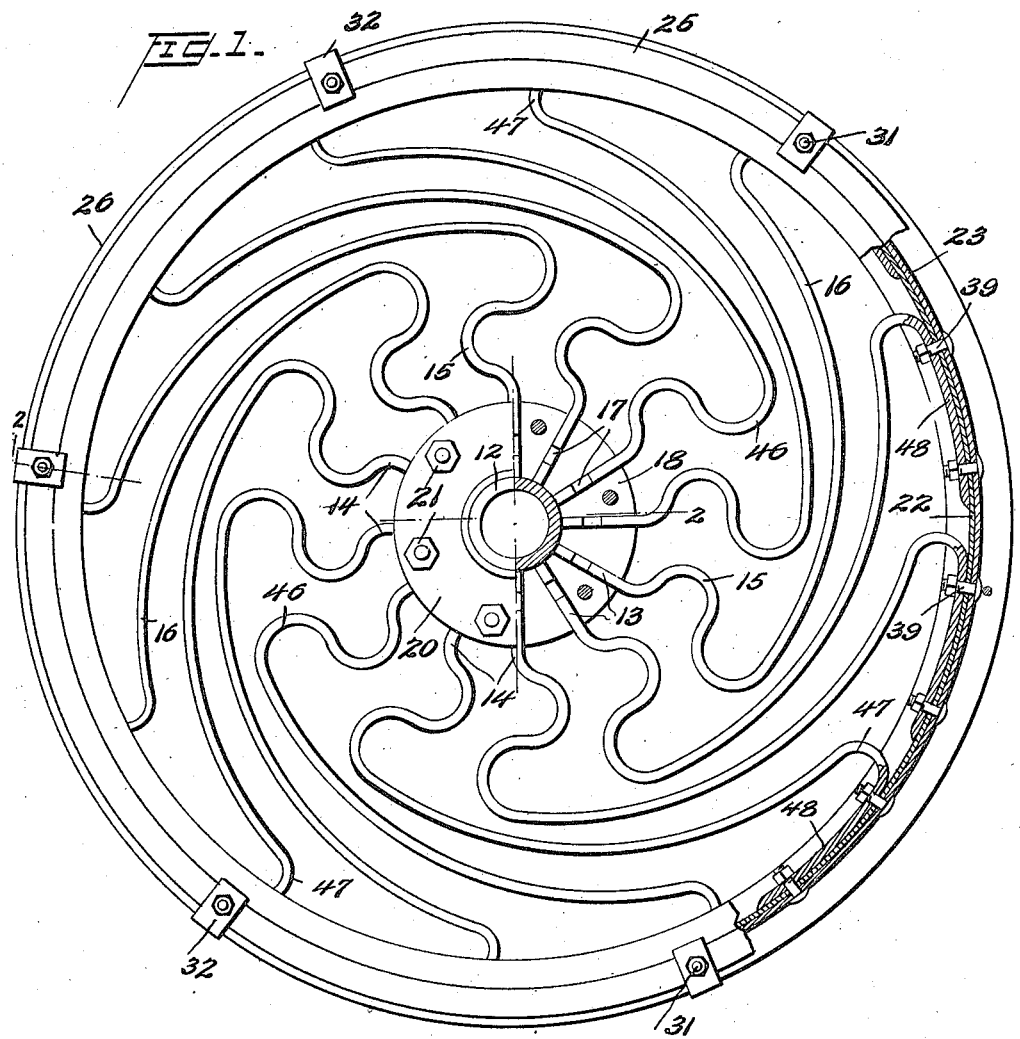

1,462,441

UNITED STATES PATENT OFFICE.

WILLIAM JAKOB BEISEL, OF PORT RICHMOND, NEW YORK.

SPRING WHEEL.

Application filed December 7, 1921. Serial No. 520,576.

*To all whom it may concern:*

Be it known that I, WILLIAM J. BEISEL, a citizen of the United States, and residing at Port Richmond, Staten Island, county of Richmond, State of New York, have invented certain new and useful Improvements in Spring Wheels, of which the following is a specification.

This invention relates to spring wheels for vehicles and is especially adapted for use on motor vehicles. The particular embodiment of it shown includes features of the hub structure disclosed and claimed in my copending application Ser. No. 487,615 filed July 26, 1921, and features of the rim structure adapting it to receive a demountable rim set forth and claimed in another application filed concurrently herewith. The novelty in the present case resides principally in the longitudinal form of the spring spokes whereby each includes a radial portion at the hub and an outer end approaching the rim at a tangent and provided with three laterally curved portions in the plane of the wheel extending on opposite sides of the radial plane of the inner portion between said inner portion and said outer end portion. Its novel features and advantages will be fully understood from the following description and claims taken with the accompanying drawings. In the drawings:

Fig. 1 is a side view of a wheel embodying the invention, the rim structure being shown partly in section and a portion of the hub cap being shown removed;

Fig. 2 is a partial section on the line 2—2 of Figure 1;

Fig. 3 is a detail section through a part of the rim showing a different form of means for securing the ends of the spokes to the rim;

Fig. 4 is a similar view of another form which may be used;

Fig. 5 is a plan view of the end of the spoke in blank form shown in combination in Figure 4;

Fig. 6 is a cross section showing another form of inner rim and a modification of the outer ends of the spokes to match the rim;

Fig. 7 is a side view of a portion of the wheel rim showing the modified structure of Figure 6; and Fig. 8 is a plan view of the blank form of the end of a spoke used in the modification shown in Figure 6.

Fig. 9 is a side view of one of the hub disks.

As shown in Figures 1 and 2 of the drawings, the hub 10 has an integral radial flange 11 near one end and the other end 12 up to that flange is cylindrical. The spokes are made of flat spring metal of uniform width and of substantially uniform thickness and are all alike and symmetrically arranged whatever number is used. Their inner ends are straight and radial entering the hub structure but have laterally curved portions between said radial hub portions and their outer ends. The inner radial ends of the spokes have rectangular side notches 17. A pair of circular disks 18 shown in Fig. 9 having central openings 48 fitting the cylindrical portion 12 of the hub, have radial slots 46 and 47 in their outer and inner edges corresponding in width to the thickness of the spokes with a solid portion 19 between the ends of the slots of such size as to fit in the rectangular notches 17 of the spokes with the adjacent edges of the spokes resting in the radial slots. A flange or circular disk 20 slides over the end of cylindrical portion 12 and fits the sides of the spokes and one of the disks 18 while the other sides of the spokes and the other disk fit integral flange 11. Bolts with nuts 21 pass through the flanges and disks between the spokes and secure them together on the hub.

The wheel hub structure of the spokes with their radially slotted retaining disks is similar to what is disclosed and claimed in my copending application, Ser. No. 487,615 filed July 26, 1921 and as there pointed out permits the wheel structure proper to be applied to or removed from old forms of hubs in commercial use.

The rim structure shown in Figures 1 and 2 will be first described. The inner rim 22 is channel shaped facing inward and is continuous forming a channel bar. An outer channel shaped rim 23 facing outwardly and slightly wider than rim 22 fits the outer surface of rim 22 and has its inner flange 24 of greater height than its outer flange 25 and its outer edge is transversely curved outwardly as shown at 26. The outer edge 27 of flange 25 is transversely curved similarly to the outer edge 26.

Bolts 31 having screw thread nuts pass through the side flanges 24 and 25 of channel rim 23 and also through retaining clips 32 which have a depending portion adapted to fit the outer and under side of flange 25 and an upper inwardly curved portion 33 above the outer edge of flange 25. The flange 25 being lower than flange 24 a demountable rim carrying a tire may, when clips 32 are turned out of the way on bolts 31 pass over that flange and make contact with the curved portion 26 of flange 24. The clips 32 may then be turned back to operative position and bolts 31 tightened to securely hold the detachable rim and tire in position.

Although the means shown in Figures 1 and 2 constitute the preferred form of connection between the ends of the spokes and the channel rim other means may be used in combination with the two channel rims the outer of which serves to receive a detachable rim. In Figure 3 for instance is shown a form of connection where a part of the end of the outer portion 16 of the spoke is curled transversely in cylindrical form 34 surrounding a bolt 35 passing through the side flanges of the inner channel rim 22 thus securing the spoke to the rim. In this case projecting portions 36 and 37 make contact with the inner surface of the base of channel rim 22 so as to prevent rattling. In Figure 4 another form is shown where the end of portion 16 of the spoke is provided with perforated side ears 38 which are bent at right angles and a bolt 39 passes through them and through the side flanges of inner channel rim 22, the projecting end of the spoke bearing against the inner face of the base of the channel.

In Figures 6, 7 and 8 I have shown a modified form of inner channel bar rim and a modified form of spoke end to fit it and have also shown an added element in the form of a continuous ring interposed between the two channel bar rims. In this instance the inner rim 40 has a narrow channel 41 facing outwardly and laterally extending portions in the form of a cylinder with the center of the hub as its axis lying flat against the inner surface of the outer channel rim 23. The outer channel rim 23 and its means for receiving and retaining a detachable rim are the same as hertofore described and shown in Figures 1 and 2. A solid continuous ring 42 fills the channel in rim 40. In this instance the side portions of the spoke are cut away at the end from the point 43 in Figure 8 and the projecting narrow portion 44 is bent transversely on longitudinal lines to right angles and fits over the inward projection formed by the narrow channel 41 of rim 40. This lateral bending of the narrow portion of the spoke extends somewhat beyond the point 43 but the wider portions of the spoke are gradually bent outward lessening the central longitudinal depression and bringing all parts of the spoke into transverse alignment or into the same transverse plane near the rim. Bolts 45 pass through the lapping sides of portion 44, the walls of channel 41 and ring 42 thereby rigidly securing the ends of the spokes to the inner rim and ring 42. It will be noted that in this form as well as that of Figures 1 and 2 the outer ends of the spokes closely fit the inner portions of the inner channel bar rim and are rigidly bolted to it.

The spokes of the wheel are formed of strips of spring metal of uniform width and thickness and each spoke is curved laterally of the plane of its inner end 13 at the point 14 near the outer edges of the hub flanges and then reversely curved back to plane of the inner end forming a laterally projecting portion 15. The outer part of this portion 15 continues across the plane of the inner end and is curved outwardly and inwardly again crossing the plane and forming a projecting portion 46 on the side of the plane opposite to that of portion 15. The outer end portion 16 beyond portion 46 extends outwardly on a curve of large radius to a point near the rim and it there turns outwardly and reversely on a curve of comparatively small radius throughout 180° forming the curved portion 47, the outer end of which enters between the side flanges of the inner channel bar rim 22. An integral extension 48 from portion 47 lies flat against and for some distance along the inner face of the base of channel bar rim 22. Bolts 39 provided with threads and nuts pass through the extension 48, the base of the inner rim 22 and the base of outer channel rim 23 and rigidly connect them together. It will be noted that the three curved lateral projections between the ends of the spokes cause the strains of the load to be taken by the spokes throughout a large proportion of their lengths in a substantially transverse direction giving great bending effect and consequent yielding and resiliency while at the same time permitting the outer ends to be secured to the rim at points angularly removed only a short distance from the planes of their inner ends. This contributes to neatness, efficiency and the proper distribution of the strains.

Although one specific embodiment of the invention is shown for purposes of illustration, it is not limited to that particular form in any respects except such as are set forth in the appended claims.

Having thus described the invention what I claim as new and desire to secure by Letters Patent is:

1. A spring wheel comprising a hub, a rim, a series of spring metal spokes secured at their inner ends to the hub each embodying three laterally unsupported portions between its ends reversely curved laterally of a radial plane through the axis of the hub in alternately opposite directions and an outer end in approximately the same arc as the rim secured to the rim, two of said reversely curved portions being closely adjacent near the hub and the third being near the rim and at a much greater distance from said radial plane than the others.

2. A spring wheel comprising a hub, a rim, a series of spring metal spokes secured at their inner ends to the hub each embodying three portions between its ends reversely curved laterally of a radial plane through the axis of the hub in alternately opposite directions and an outer end in approximately the same arc as the rim secured to the rim, two of said reversely curved portions being closely adjacent near the hub and the third near the rim, the part of each spoke between the second and outer curved portions extending for a much greater distance beyond a radial plane through the inner ends of the spokes than the inner curved portions and on the arc of a curve of large radius.

3. A spring wheel comprising a hub, a rim, a series of spring metal spokes having inner end portions in radial planes secured to the hub and each embodying two adjacent portions near the hub reversely curved laterally of the plane of its inner end thus projecting on opposite sides of said plane and a portion extending laterally and gradually outward on a curve of large radius to a point near the rim and there reversely curved with reference to a radial plane at a much greater distance from the radial plane of its inner end than said other reversely curved portions with its end lying along and in contact with the inner surface of the rim and means rigidly securing said end to the rim.

4. A spring wheel structure comprising in combination, an outwardly facing channel bar rim rectangular in cross section having laterally outward extending portions along the outer edges of its side walls, a series of transversely flat spring spokes curved in the plane of the wheel between their ends, the outer ends being so shaped as to fit the sides and base of the channel of the rim and means for securing said ends to the portion of the rim forming said channel.

5. A spring wheel structure comprising in combination, an outwardly facing channel bar rim having laterally outward extending portions along the outer edges of its side walls, a continuous metal ring in and substantially fitting the channel in said rim, a series of flat spring metal spokes curved in the plane of the wheel between their ends, the outer end portion of each spoke extending along the inner surface of the rim and so shaped transversely as to fit the sides and base of the channel of the rim and bolts passing transversely through the end portion of the spokes, the channel part of the rim and the ring contained in the channel.

In testimony whereof I hereunto affix my signature.

WILLIAM JAKOB BEISEL.